US012196673B2

(12) United States Patent
Utsugi et al.

(10) Patent No.: US 12,196,673 B2
(45) Date of Patent: Jan. 14, 2025

(54) DEFECT INSPECTION APPARATUS AND DEFECT INSPECTION METHOD

(71) Applicant: Hitachi High-Tech Corporation, Tokyo (JP)

(72) Inventors: Takeru Utsugi, Tokyo (JP); Toshifumi Honda, Tokyo (JP); Andreas Karsaklian Dal Bosco, Tokyo (JP); Tomoto Kawamura, Tokyo (JP); Kenshiro Ohtsubo, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 203 days.

(21) Appl. No.: 17/798,574

(22) PCT Filed: Mar. 31, 2020

(86) PCT No.: PCT/JP2020/014930
§ 371 (c)(1),
(2) Date: Aug. 10, 2022

(87) PCT Pub. No.: WO2021/199340
PCT Pub. Date: Oct. 7, 2021

(65) Prior Publication Data
US 2023/0060883 A1 Mar. 2, 2023

(51) Int. Cl.
G01N 21/47 (2006.01)
G01N 21/88 (2006.01)
(Continued)

(52) U.S. Cl.
CPC ......... G01N 21/47 (2013.01); G01N 21/8806 (2013.01); G01N 21/9501 (2013.01);
(Continued)

(58) Field of Classification Search
CPC .................................................. G01N 21/9501
See application file for complete search history.

(56) References Cited

U.S. PATENT DOCUMENTS 5,966,019 A 10/1999 Borden
6,956,644 B2 10/2005 Biellak et al.
(Continued)

FOREIGN PATENT DOCUMENTS

CN 112041974 A1 12/2020
JP 09-281051 A 10/1997
(Continued)

OTHER PUBLICATIONS

International Search Report of PCT/JP2020/014930 dated Jul. 21, 2020.
(Continued)

Primary Examiner — Rufus L Phillips
(74) Attorney, Agent, or Firm — MATTINGLY & MALUR, PC

(57) ABSTRACT

A defect inspection apparatus includes a first objective lens having an optical axis is perpendicular to a wafer mounting surface of the stage, a second objective lens having an optical axis forms a predetermined acute angle with respect to the wafer mounting surface of the stage, and a dichroic mirror which reflects light having a first wavelength and transmits or reflects light having a second wavelength. Emitted light of a first optical path 111 from a first light source which is reflected from or transmitted through the dichroic mirror and first emitted light and second emitted light polarized and separated from a second light source which are transmitted through or reflected from the dichroic mirror are incident on the first objective lens, and emitted light of a second optical path from the first light source is incident on the second objective lens.

10 Claims, 13 Drawing Sheets

(51) Int. Cl.
  *G01N 21/95* (2006.01)
  *G01N 21/956* (2006.01)

(52) U.S. Cl.
  CPC ... *G01N 21/956* (2013.01); *G01N 2021/4735* (2013.01); *G01N 2021/8825* (2013.01); *G01N 2021/8848* (2013.01); *G01N 2021/9511* (2013.01)

(56) References Cited

U.S. PATENT DOCUMENTS

| | | |
|---|---|---|
| 7,463,349 B1 | 12/2008 | Biellak et al. |
| 2002/0162979 A1 | 11/2002 | Kusunose |
| 2005/0206885 A1 | 9/2005 | Kurata |
| 2007/0182958 A1 | 8/2007 | Manabe et al. |
| 2009/0180176 A1 | 7/2009 | Armstrong et al. |
| 2016/0334342 A1 | 11/2016 | Chuang et al. |
| 2019/0285407 A1 | 9/2019 | Chuang et al. |

FOREIGN PATENT DOCUMENTS

| | | | |
|---|---|---|---|
| JP | 2002-328099 A | | 11/2002 |
| JP | 2005-266083 A | | 9/2005 |
| JP | 2007-240512 A | | 9/2007 |
| JP | 2008-128811 A | | 6/2008 |
| JP | 2011-517487 A | | 6/2011 |
| JP | 2013164281 A | * | 8/2013 |
| JP | 2018-517902 A | | 7/2018 |

OTHER PUBLICATIONS

International Preliminary Report of on Patentability of PCT/JP2020/014930 dated Sep. 8, 2021.

\* cited by examiner

FIG. 11B

| | OBLIQUE ILLUMINATION INCIDENCE CONDITION 1 | OBLIQUE ILLUMINATION INCIDENCE CONDITION 2 |
|---|---|---|
| H1 | (500, 510, 520) | |
| H2 | | |

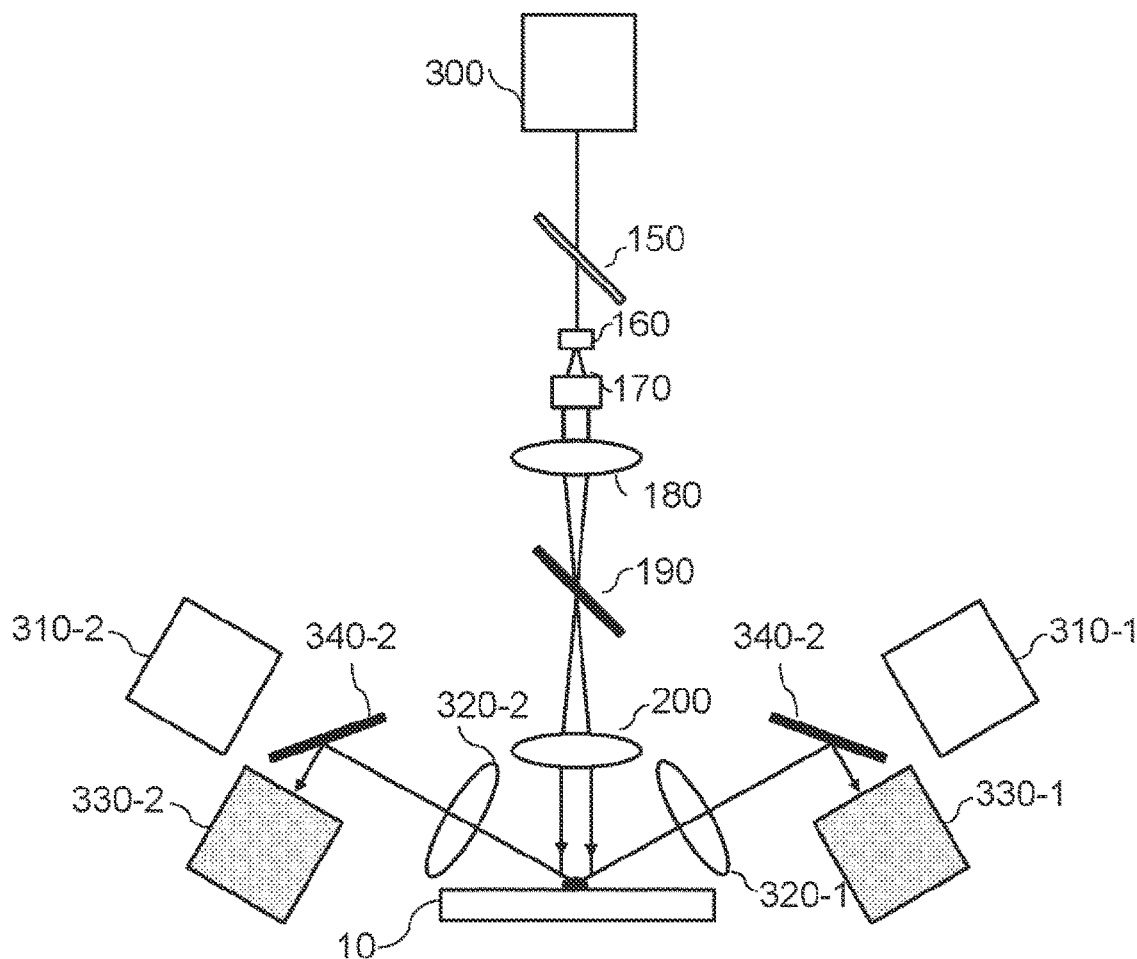

DEFECT INSPECTION APPARATUS AND DEFECT INSPECTION METHOD

TECHNICAL FIELD

The present invention relates to a defect inspection apparatus and a defect inspection method using light with a semiconductor wafer or the like as an inspection target.

BACKGROUND ART

As semiconductor devices are miniaturized, a surface state of a semiconductor wafer and a defect size and a shape on the wafer have a large influence on device performance and yield. Kinds of defects also vary depending on a difference in a process in which the defect is generated. For example, it is necessary to inspect a minute granular defect (minute defect) of about 10 to several tens nm or a very gentle defect (low step defect) having a height of several nm and a width of about several to several tens μm.

Conventionally, a method for performing inspection by using light rays having two different wavelengths has been studied as an optical method for detecting two kinds of defects (a minute defect and a low step defect) as described above.

For example, in PTL 1, two kinds of defects can be detected by spatial division of a visual field by using light rays having two different wavelengths. For example, in PTL 2, information on defects can also be acquired by epi-illumination and oblique illumination by using light rays having two different wavelengths.

CITATION LIST

Patent Literature

PTL 1: JP 2011-517487 A
PTL 2: U.S. Pat. No. 6,956,644

SUMMARY OF INVENTION

Technical Problem

In general, minute defects can be inspected by an optical system (scattered light inspection) that detects laser scattered light. However, as the defect becomes smaller, scattered light intensity decreases. Accordingly, it is important to increase sensitivity of a detection system, and thus, the sensitivity can be increased by using epi-illumination, oblique illumination, and optical systems of upward detection and oblique detection.

On the other hand, since the low step defect has a gentle shape, scattered light is hardly generated. Thus, detection in the scattered light inspection is difficult, and interference measurement such as differential interference contrast (DIC) inspection is useful. In the DIC inspection, a bright field detection optical system using the epi-illumination and the upward detection can be provided, and thus, it is possible to detect the low step defect.

When the above two kinds of defects can be simultaneously detected, an inspection time can be shortened. On the other hand, it is also necessary to simplify the optical system (downsize the system) as much as possible from the viewpoint of apparatus stability and cost. When the optical systems of the scattered light inspection and the DIC inspection are separately constructed, an increase in a size of the system is inevitable. Thus, it is desired to realize an optical system simultaneously having functions of the scattered light inspection and the DIC inspection.

In PTL 1, an objective lens is shared by two wavelengths, and thus, simultaneous inspection is realized by the spatial division of the visual field while the increase in the size of the system is avoided. However, since regions of one wavelength and the other wavelength in an image of a sample detected by the detection optical system are exclusively separated by a mirror, it is not possible to directly monitor a relative relationship between spot positions of light rays having two wavelengths on an inspection target, and it is difficult to obtain information of an inspection position with high accuracy.

Although a DIC inspection mode is included as an inspection mode of PTL 1, since an optical system of a forward path and an optical system of a return path do not match, it is necessary to separately use optical elements such as a Nomarski prism that separates an optical path by polarizations usually used in the optical system of the DIC inspection in the forward path and the return path. Thus, there is a concern that the system becomes complicated and stability as an interferometer is lowered.

PTL 2 discloses that light rays having two wavelengths are separated by wavelengths, and light having one wavelength is emitted by a vertical irradiation optical path perpendicular to a sample surface, and light having the other wavelength is emitted by an oblique irradiation optical path inclined with respect to the sample surface. PTL 2 discloses that the scattered light inspection is performed with irradiated light, but does not disclose the DIC inspection.

Solution to Problem

A defect inspection apparatus according to an aspect of the present invention is a defect inspection apparatus that inspects a defect of a wafer. The apparatus includes a first light source which emits light having a first wavelength, a beam branching unit which branches the emitted light from the first light source into a first optical path and a second optical path, a second light source which emits light having a second wavelength longer than the first wavelength, a polarization separation type prism which separates the emitted light from the second light source into first emitted light having a first polarization direction and second emitted light having a second polarization direction orthogonal to the first polarization direction, a stage on which the wafer is mounted, a first objective lens which is disposed such that an optical axis is perpendicular to a wafer mounting surface of the stage, a second objective lens which is disposed such that an optical axis forms a predetermined acute angle with respect to the wafer mounting surface of the stage, and a first dichroic mirror which reflects the light having the first wavelength and transmits the light having the second wavelength or transmits the light having the first wavelength and reflects the light having the second wavelength. The emitted light of the first optical path from the first light source which is reflected from or transmitted through the first dichroic mirror and the first emitted light and the second emitted light from the second light source which are transmitted through or reflected from the first dichroic mirror are incident on the first objective lens, and the emitted light of the second optical path from the first light source is incident on the second objective lens.

Advantageous Effects of Invention

According to the present invention, in the defect inspection, different kinds of defects such as minute defects and low step defects can be simultaneously inspected with high sensitivity.

Other objects, and novel features will be apparent from the description of the present specification and the accompanying drawings.

BRIEF DESCRIPTION OF DRAWINGS

FIG. 11B is a diagram illustrating a change in the light spot position by the oblique illumination depending on the height of the wafer surface.

FIG. 13 is a modification example of the optical system of the defect inspection apparatus.

FIG. 14 is a table in which a relationship between the illumination system and the detection system of the defect inspection apparatus and an embodiment and modification examples is organized.

DESCRIPTION OF EMBODIMENTS

Hereinafter, an embodiment of the present invention will be described with reference to the drawings.

(System Configuration)

Figure 1:
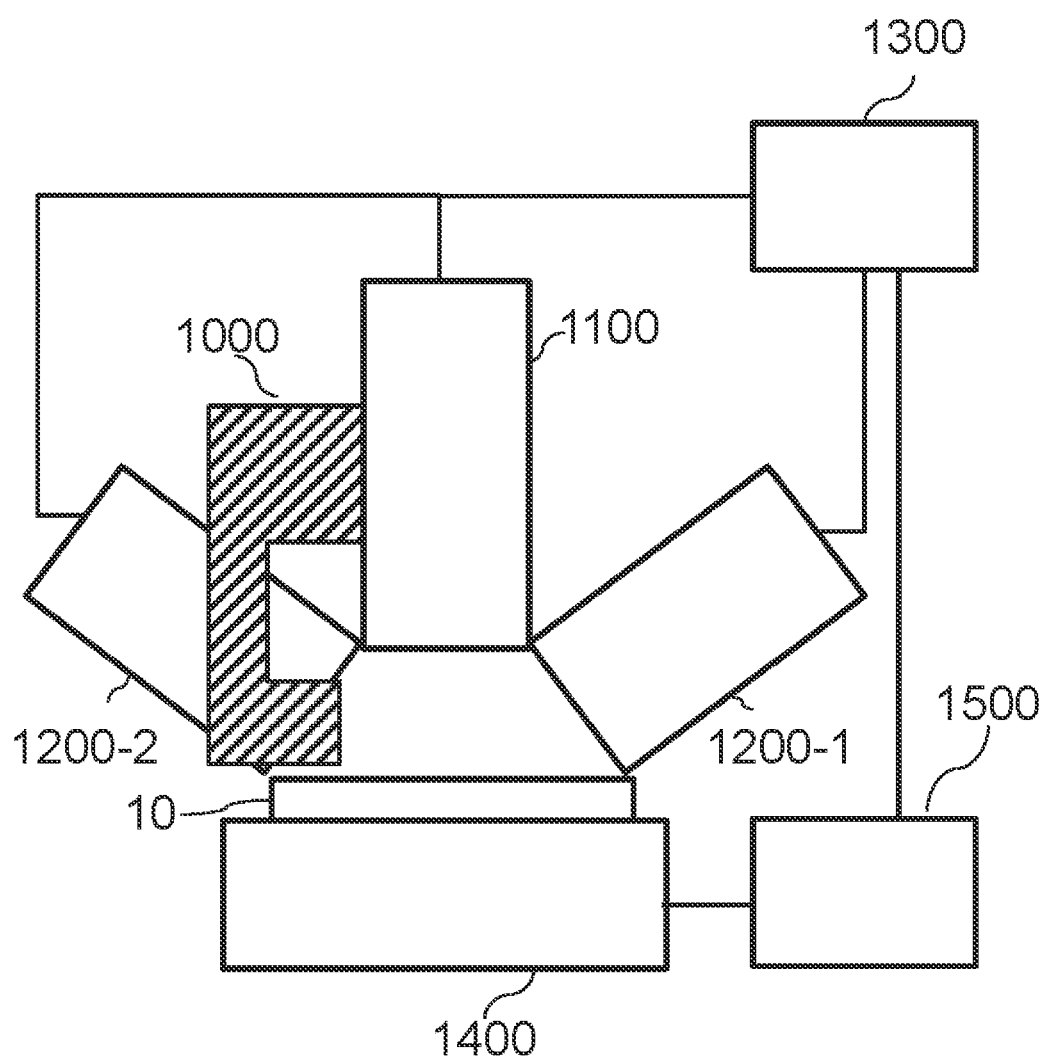
FIG. 1 is a block diagram illustrating a schematic configuration of a defect inspection apparatus.

FIG. 1 is a block diagram illustrating a schematic configuration of a defect inspection apparatus. The defect inspection apparatus includes an oblique illumination optical system 1000, a DIC and epi-illumination optical system 1100, oblique detection optical systems 1200-1 and 1200-2, a signal processing unit 1300, a stage unit 1400, and a control unit 1500. A first oblique detection optical system 1200-1 and a second oblique detection optical system 1200-2 are arranged substantially symmetrically with respect to the DIC and epi-illumination optical system 1100. Since the oblique detection optical systems 1200-1 and 1200-2 basically have the same configuration and have the same function, these oblique detection optical systems are collectively described as the oblique detection optical system 1200 in the following description. Configurations of the oblique illumination optical system 1000, the DIC and epi-illumination optical system 1100, and the oblique detection optical system 1200 will be described in detail below. The signal processing unit 1300 processes an obtained detection signal and outputs information on a defect desired to be obtained. The stage unit 1400 and the control unit 1500 control an operation of a stage, and rotate or scan a wafer as an inspection target, for example, to inspect the defect at a high speed. Note that, in the stage, a surface on which the wafer as the inspection target is mounted is referred to as a wafer mounting surface.

Figure 2:
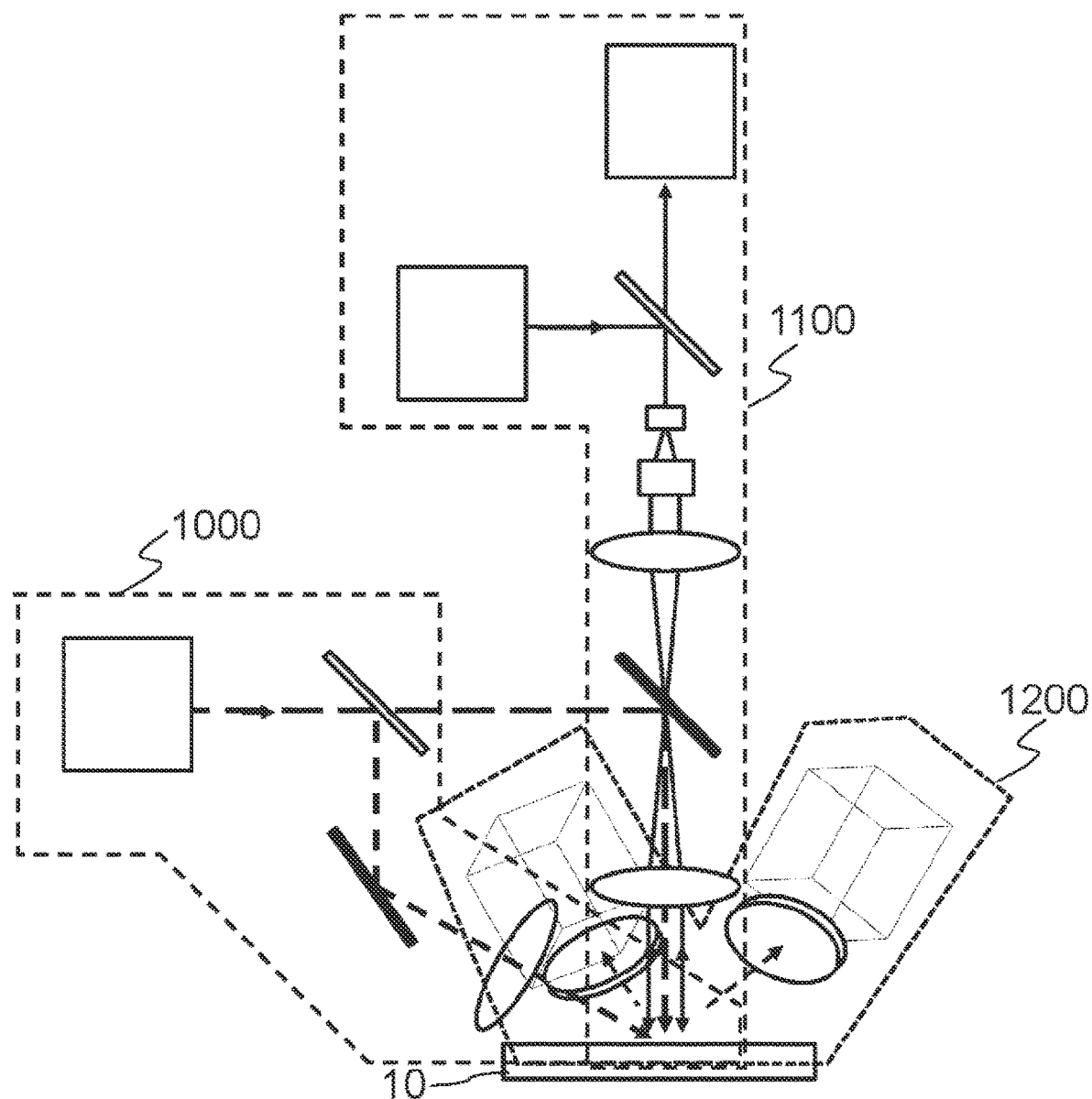
FIG. 2 is a schematic configuration diagram of an entire optical system of the defect inspection apparatus.

FIG. 2 is a schematic configuration diagram of the entire optical system of the defect inspection apparatus. As described above, the optical system includes three optical systems of the oblique illumination optical system 1000, the DIC and epi-illumination optical system 1100, and the oblique detection optical system 1200.

(Illumination Optical System)

Figure 3:
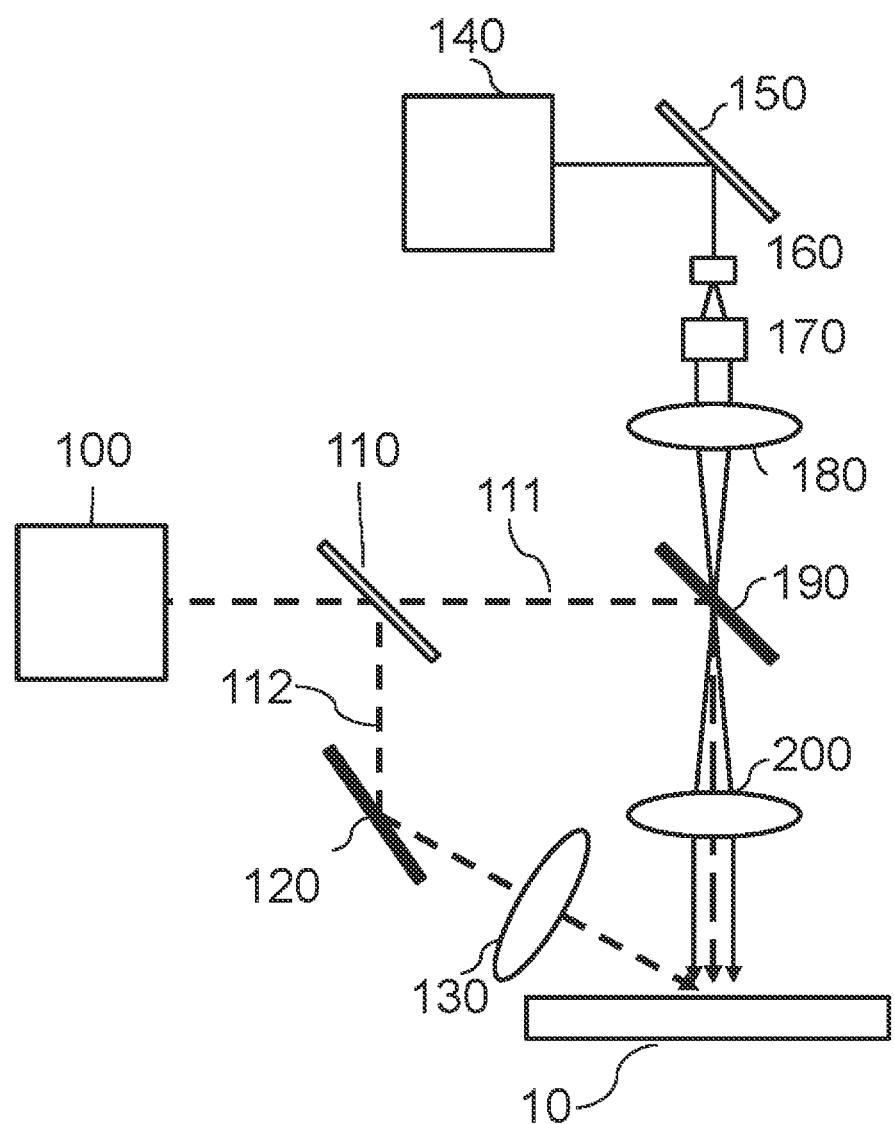
FIG. 3 is a diagram illustrating an illumination optical system of the defect inspection apparatus.

FIG. 3 is a diagram in which the illumination optical system is extracted from the optical system illustrated in FIG. 2. This optical system includes two light sources having different wavelengths. A pulsed light source 100 is an optical unit including, for example, a pulsed laser in a wavelength range (short wavelength) of ultra violet (UV) or deep ultra violet (DUV) and an optical system that controls power, a beam shape, polarization, and the like of pulsed light. On the other hand, a continuous wave (CW) light source 140 is an optical unit including a continuous wave oscillation laser having high coherence and an optical system that controls power, a beam shape, polarization, and the like of CW light. A wavelength range of the CW light emitted from the CW light source 140 is visible light (long wavelength).

The reason why a wavelength of the pulsed light from the pulsed light source 100 is set to be shorter than a wavelength of the CW light from the CW light source 140 is that the pulsed light source 100 is used for scattered light inspection and the CW light source 140 is used for DIC inspection. In the scattered light inspection, an effect of increasing sensitivity due to the short wavelength is larger. Indeed, in Rayleigh scattering due to defects such as fine particles in scattered light inspection, it is known that scattering intensity is inversely proportional to the fourth power of a wavelength of incident light. On the other hand, the sensitivity of the DIC inspection is inversely proportional to approximately the first power of the wavelength of the incident light. As described above, in the scattered light inspection, the effect of increasing the sensitivity by setting a wavelength of light to be shorter than a wavelength in the DIC inspection is large.

Emitted light of the pulsed light source 100 which is a light source for the scattered light inspection is guided to an epi-illumination optical path 111 and an oblique illumination optical path 112 by a beam branching unit 110. The beam branching unit 110 can be constituted by a beam splitter that partially transmits and reflects light (such as a polarization beam splitter whose transmittance can be adjusted by polarization adjustment) or a variable mirror that switches between two optical paths (such as a polarization beam splitter that switches by polarization and a mechanical insertion and removal of a mirror). Light of the epi-illumination optical path 111 becomes epi-illumination by being reflected by a dichroic mirror 190, passing through an objective lens 200 disposed such that an optical axis is perpendicular to the wafer mounting surface, and being incident to be substantially perpendicular to a wafer 10. On the other hand, light of the oblique illumination optical path 112 becomes oblique illumination by being reflected by a mirror 120, passing through an objective lens 130 disposed such that an optical axis forms a predetermined acute angle with respect to the wafer mounting surface, and being incident on the wafer 10 at a large incident angle.

Note that, the dichroic mirror of this optical system is used as a generic term for mirrors having different reflectances (transmittances) depending on wavelengths. The dichroic mirror functions to couple and separate optical paths depending on wavelengths.

A part of emitted light of the CW light source 140 which is a light source for the DIC inspection becomes DIC illumination by being reflected by a beam splitter 150, being transmitted through a Nomarski prism 160 and a lens 170, then being transmitted through a relay lens 180 and the dichroic mirror 190 for forming an image of the CW light source on the wafer, and being incident to be substantially perpendicular to the wafer 10 by the objective lens 200. In the DIC illumination, an optical path is branched into two by a polarization separation type prism such as the Nomarski prism 160, and two light spots separated by an amount called a shear amount are formed on the wafer 10.

This illumination optical system realizes three kinds of illumination including the epi-illumination and the oblique illumination by the pulsed light source 100 and the DIC illumination (two spots separated by the shear amount) by the CW light source 140. Here, the objective lens 200 serves to irradiate the wafer 10 with two light rays having different wavelengths. Thus, the objective lens 200 is designed such that a focal length and transmittance are equal for the two wavelengths.

(Detection Optical System)

Figure 4:
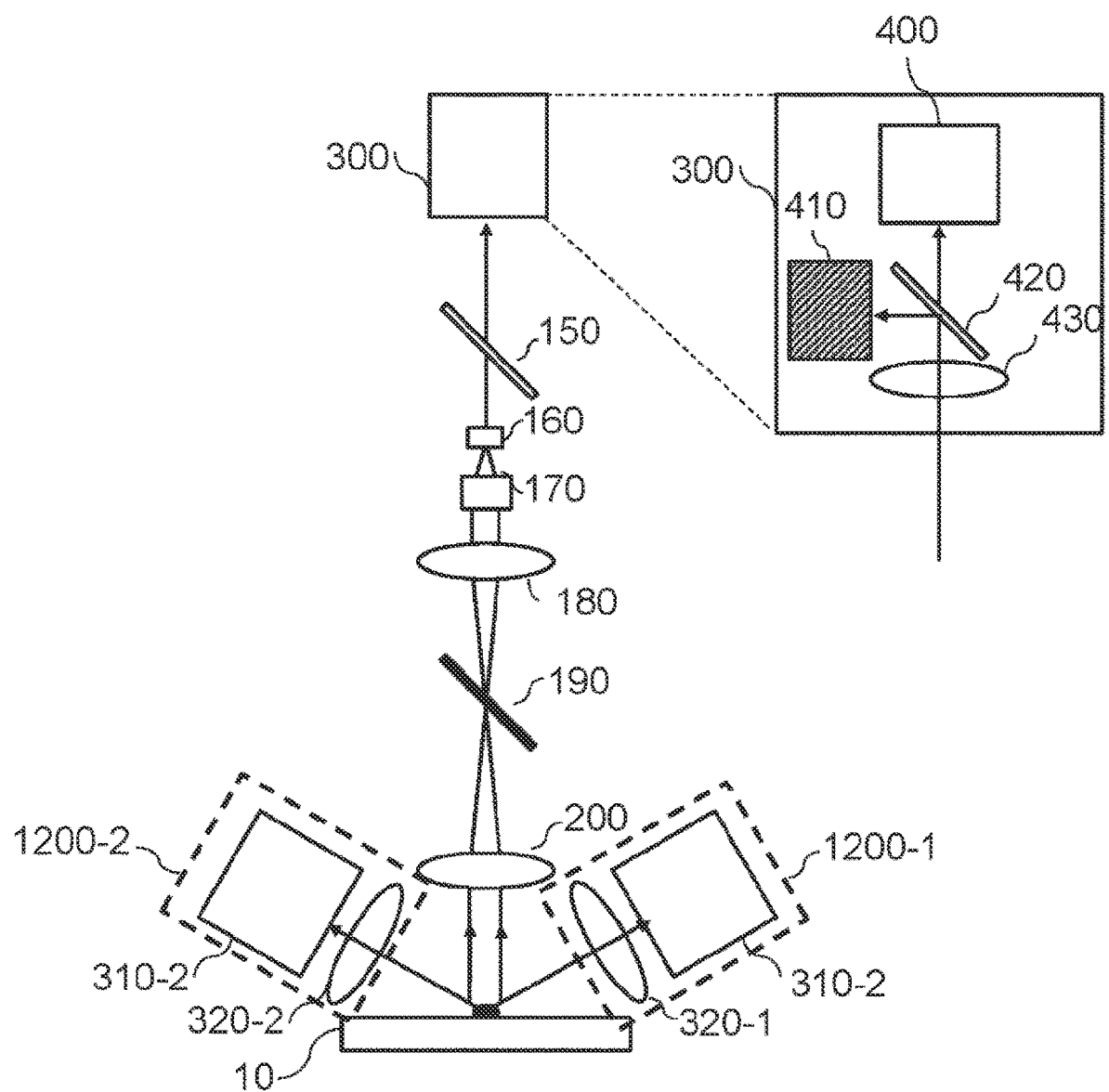
FIG. 4 is a diagram illustrating a detection optical system of the defect inspection apparatus.

FIG. 4 is a diagram in which the detection optical system is extracted from the optical system illustrated in FIG. 2. The detection optical system includes the oblique detection optical system and the DIC detection optical system, and light generated by reflection or scattering from the wafer 10 illuminated by the above-described illumination optical system is detected by the detection optical system.

The oblique detection optical system 1200 is constituted by a detector 310 that detects UV or DUV light and an imaging optical system 320 that forms an image of the scattered light on the detector 310. An optical axis of the imaging optical system 320 is disposed so as to form a predetermined acute angle with respect to the wafer mounting surface, and the detector 310 can detect minute defects by detecting scattered light at a shallow angle (an angle formed with a wafer surface is small) from the wafer surface with high sensitivity.

The DIC detection optical system is constituted by a DIC detection unit 300 that detects light in a visible range with high sensitivity and an imaging optical system that finally guides reflected light to the DIC detection unit 300. An optical element constituting the imaging optical system of the DIC detection optical system is set to be shared with an optical element of the illumination optical system in which the emitted light of the CW light source 140 is used as the DIC illumination. Reflected light of the DIC illumination on the wafer surface is transmitted through the objective lens 200, the dichroic mirror 190, the relay lens 180, the lens 170, the Nomarski prism 160, and the beam splitter 150, and is incident on the DIC detection unit 300. The DIC detection unit 300 detects, as an interference signal, a phase difference between two points separated by the shear amount on the wafer. Since this phase difference reflects a difference in height on the wafer, a low step defect on the wafer can be detected from the detection signal of the DIC detection unit 300. It is also possible to restore a defect shape by signal processing of the detection signal.

As described above, in the defect inspection apparatus of the present embodiment, the two optical systems used for the scattered light inspection and the DIC inspection are integrally constituted such that the inspection of the minute defect and the inspection of the low step defect can be simultaneously performed. More specifically, the defect inspection apparatus has the following features.

(1) The oblique illumination and the oblique detection optical system are used for the scattered light inspection, and thus, scattered light in a wide range is detected without using an objective lens having a high NA. A focal depth of the objective lens is kept long, and thus, inspection stability can be maintained even against minute vibration, fluctuation, and the like of the inspection target (sample).

(2) A forward path (illumination optical system) and a return path (detection optical system) of the DIC optical system are set to be shared. Thus, the optical system is simplified, and stability as an interferometer is also enhanced.

(3) Both of the epi-illumination for the scattered light inspection and the DIC illumination for the DIC inspection require light to be incident to be substantially perpendicular to the wafer. The optical paths of the two optical systems are coupled and separated by the dichroic mirror 190 by using the fact that the wavelengths of light used are different between these illuminations. As a result, the objective lens 200 is set to be shared, and the illumination optical system can be constructed compactly.

Here, while the configuration in which the optical paths having different wavelengths are coupled and separated by the dichroic mirror 190 has the effect as in the above (3), the light having one wavelength and the light having the other wavelength cannot be completely separated. Thus, when the scattered light inspection and the DIC inspection are simultaneously performed, for example, scattered light (visible light) of the DIC inspection is incident on a detection optical path (detection optical path of UV light) of the scattered light inspection, or reflected light (UV light) of the epi-illumination is incident on a detection optical path (detection optical path of visible light) of the DIC inspection. Light having a wavelength different from an original wavelength and entering such an optical path is referred to as stray light. When there is a large defect in the inspection target or when an inspection portion is a portion where relatively large scattered light is generated, such as an edge of the wafer, the influence of the stray light tends to be large. In the scattered light inspection using UV light or DUV light, since inspection is performed by detecting weak scattered light from the minute defect by a highly sensitive detector, a noise signal due to stray light of visible light tends to cause erroneous defect detection. In the DIC inspection, since inspection is also performed by detecting a minute interference signal due to the low step defect, a noise signal due to stray light of UV light or DUV light tends to be a factor of the erroneous defect detection.

In order to eliminate the influence of such stray light, each of the detector for the scattered light inspection and the detector for the DIC inspection desirably includes a dichroic filter corresponding to a wavelength of light to be used. As a result, only a specific wavelength can be transmitted, and light (stray light) having an unnecessary wavelength can be reflected or absorbed so as not to reach the detector. The dichroic filter here may be a filter formed by a dielectric multilayer film or the like and may be a filter that transmits not only some wavelengths but also only light having a wavelength longer than a predetermined wavelength or light having a wavelength shorter than a predetermined wavelength (long pass filter or short pass filter). However, such a filter is provided, and thus, a loss of the amount of light occurs even for light having a wavelength originally desired to be detected. Accordingly, a filter to be used needs to have a transmittance at a level at which detection efficiency is not greatly reduced for light having the original wavelength.

Figure 5A:
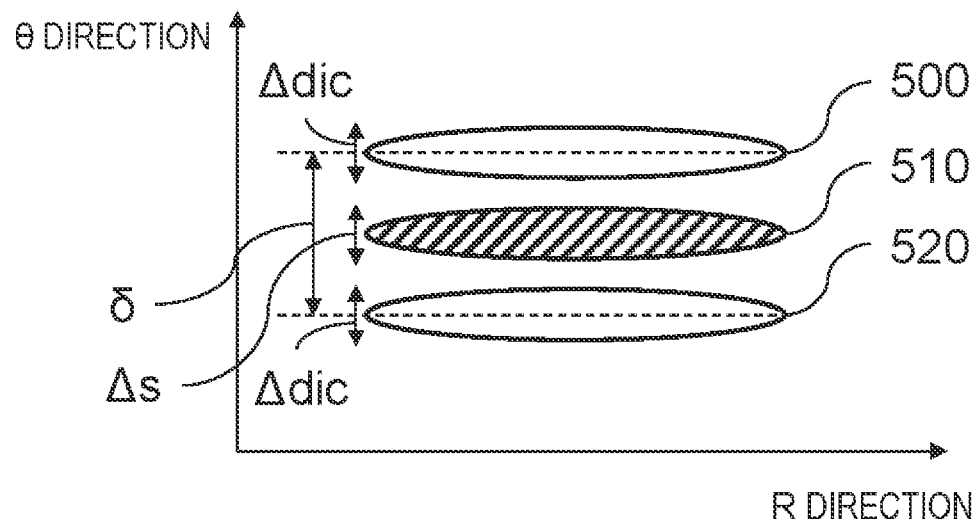
FIG. 5A is a diagram illustrating a light spot position on a wafer.
Figure 5B:
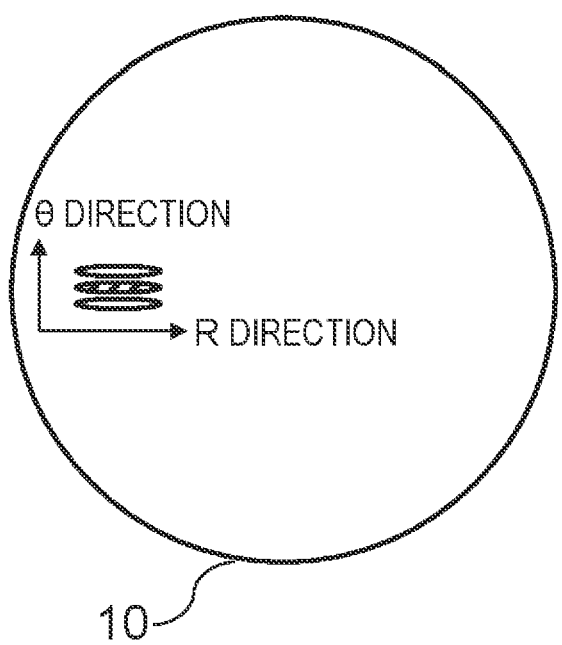
FIG. 5B is a diagram for describing a coordinate system indicating the light spot position.

Another method for eliminating the influence of the stray light is spatial filtering that spatially shifts positions of light spots having different wavelengths. FIG. 5A illustrates a light spot position for the scattered light inspection and a light spot position for the DIC inspection on the wafer 10. Note that, FIG. 5B illustrates a state where the illuminated wafer 10 is viewed from a top surface, and is a diagram for describing a coordinate system when the position of the light spot is indicated. An R direction is a radial direction of the wafer, and a θ direction is a direction orthogonal to the R direction and is a rotation direction of the wafer. In order to inspect the entire surface of the wafer at high speed, the defect inspection apparatus scans the wafer in the R direction while the wafer is rotated in the θ direction. Each of the light spots has a linearly extending shape having a longer diameter in the R direction than in the θ direction. As a result, since a longitudinal direction can be inspected in parallel by a line sensor, it is possible to realize high-speed inspection.

DIC inspection light spots 500 and 520 are two light spots separated by polarizations orthogonal to each other by the Nomarski prism 160, and polarization directions thereof are orthogonal to each other. These two light spots are separated from each other on the wafer by a sear amount δ in a sear direction matching the θ direction. Scattered light inspection light spot 510 by the oblique illumination or the epi-illumination is positioned substantially at a center between the DIC inspection light spots 500 and 520. As a result, it is possible to substantially match instantaneous inspection positions of the DIC inspection and the scattered light inspection.

As described above, the scattered light inspection light spot (UV light or DUV light) and the DIC inspection light spot (visible light) are spatially separated (shifted) on the wafer, and thus, the influence of stray light rays on each other can be effectively reduced. The positions of the light spots are different, it is possible to prevent the scattered light of the DIC inspection light from being incident on the detector by masking a region corresponding to a position of the DIC inspection light spot on a detection surface (imaging surface) of the detector of the oblique detection optical system of the scattered light inspection. Similarly, in the DIC detection optical system of the DIC inspection, it is possible to prevent the reflected light of the scattered inspection light from being incident on the detector by masking a region corresponding to a position of the scattered light inspection light spot on the detection surface (imaging surface) of the detector of the DIC detection unit.

Thus, the arrangement of the light spots is set to satisfy a relationship defined in the following (Expression 1).

$$\Delta s \leq \delta - \Delta dic \qquad \text{(Expression 1)}$$

Here, Δs is a spot diameter of the scattered light inspection light spot in the θdirection, Δdic is a spot diameter of the DIC inspection light spot in the θdirection, and δ is a shear amount in the θdirection. As a result, it is possible to avoid overlapping of light spots having different wavelengths. The light spots do not overlap each other as described above, and thus, an intensity density of light applied to one portion of the wafer is reduced. There is also an effect of reducing damage to the wafer.

Note that, here, although the example in which the sear direction matches the θdirection has been described, the longitudinal direction of the light spot may be set to match the θdirection. In this case, the shear direction is set to match the R direction, and (Expression 1) may be read as the spot diameter in the R direction.

FIG. 4 illustrates an example of an internal configuration of the DIC detection unit 300. The DIC detection unit 300 includes an imaging lens 430, a light distribution monitor 410, and a detector 400, and a mode can be switched between a light monitor on the wafer by the light distribution monitor 410 and the defect inspection by the detector 400 by a switching mirror 420. The detector 400 is a line sensor, and the light distribution monitor is a two-dimensional imaging element. Since the light incident on the DIC detection unit 300 includes light rays having different wavelengths of both UV light (or DUV light) and visible light, the light distribution monitor 410 can capture a light spot image illustrated in FIG. 5A, and it is possible to confirm whether or not the wafer is irradiated with the scattered light inspection light spot and the DIC inspection light spot in an appropriate positional relationship by the illumination optical system, and it is possible to obtain information on the inspection position with high accuracy.

Figure 6:
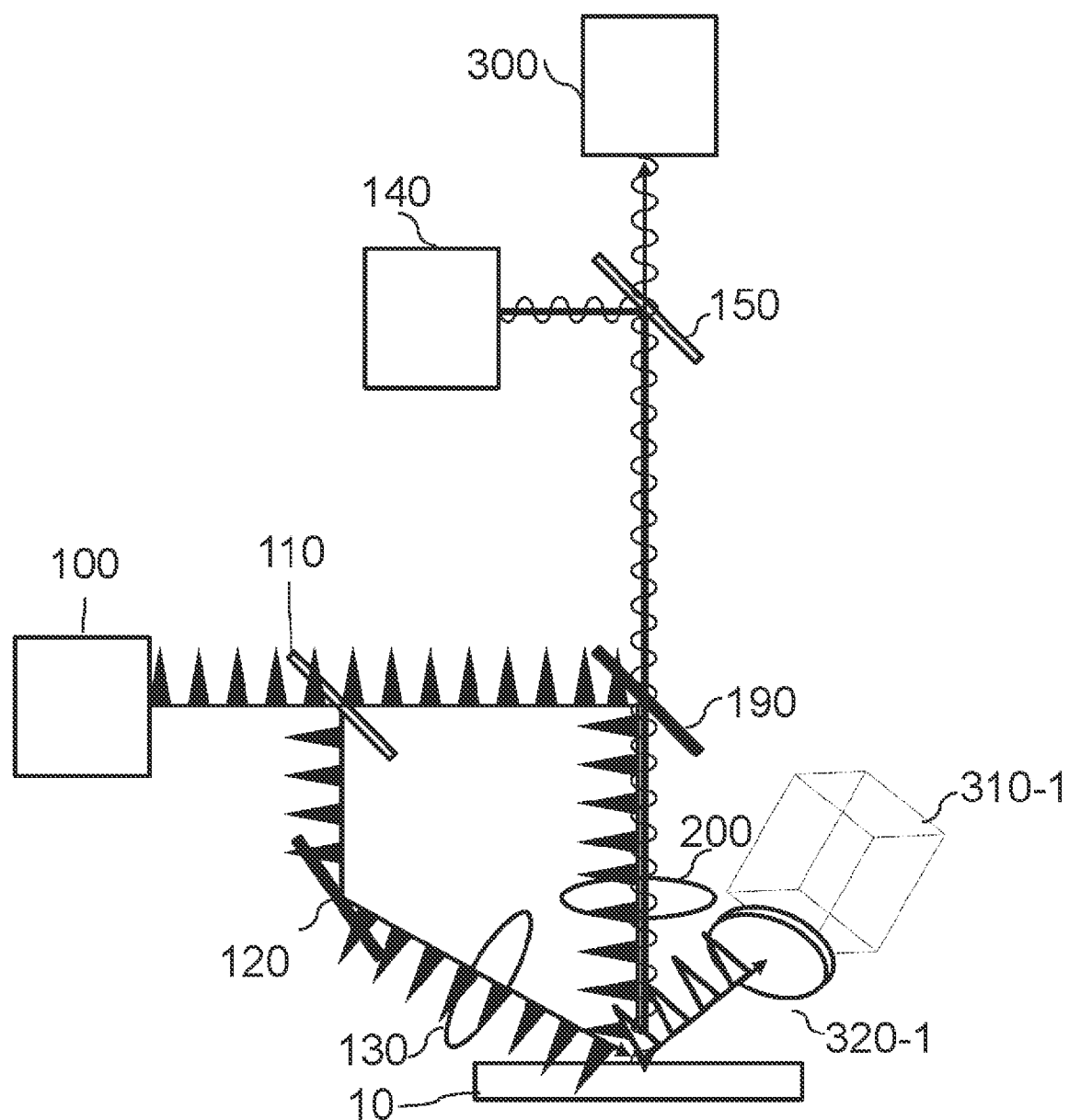
FIG. 6 is a schematic diagram illustrating characteristics of light emitted from an illumination system and incident on a detection system.

FIG. 6 is a schematic diagram of characteristics of light emitted from an illumination system and incident on a detection system in the present embodiment. Here, the oblique detection optical system 1200-2 and some optical elements are omitted for the sake of simplification in the drawing. The pulsed light is generated from the pulsed light source 100 for the scattered light inspection. A continuous wave is generated from the CW light source 140 for the DIC inspection. The light rays are reflected or scattered by the wafer, are incident on the detector 310 and the DIC detection unit 300 of the oblique detection optical system 1200, and are detected. Here, since the detector 310 is used for the scattered light inspection, only pulsed light may be detected. Since the DIC detection unit 300 is used for the DIC inspection, only the continuous wave may be detected. Thus, the influence of stray light can be further reduced by matching the characteristics of light for detecting each detector.

For example, since the detector 310 of the oblique detection optical system 1200 detects the pulsed light, a photon detector (instantaneous detector) such as a photomultiplier tube (PMT) or an avalanche photodiode (APD) is desirably used as the detector. The influence of stray light of continuous light can be greatly reduced by using such a photon detector and setting a time window for detection in synchronization with a pulse emission timing of the pulsed light source. On the other hand, since the DIC detection unit 300 detects continuous light, a light intensity detector (integrated detector) such as a photodiode, a CCD, or a CMOS image sensor is desirably used as the detector. The influence of stray light of the pulsed light can be greatly reduced by using such a light intensity detector and setting a time window for detection only when a pulse is not coming in reverse synchronization with the pulse emission timing of the pulsed light source.

Figure 7:
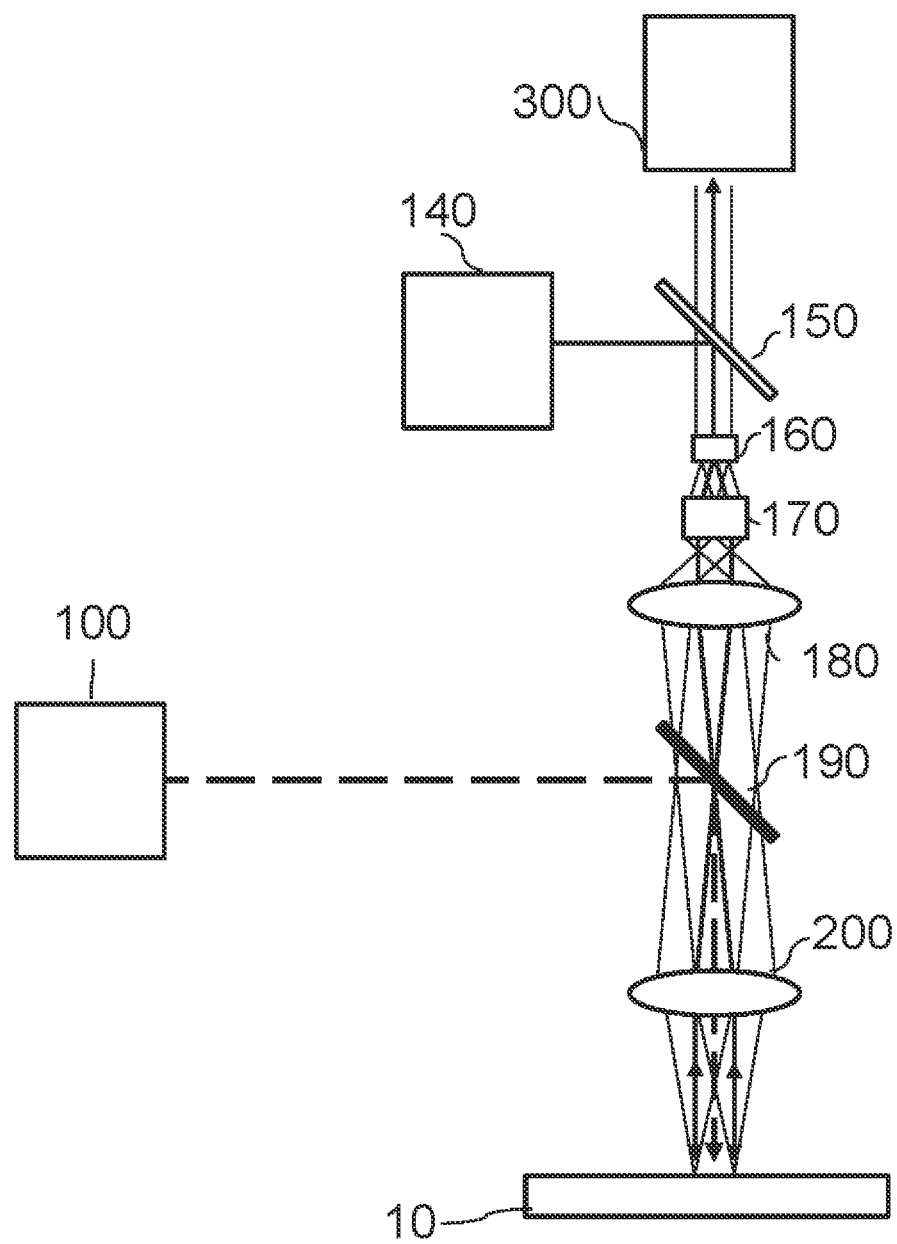
FIG. 7 is a schematic diagram illustrating an optical system of DIC inspection.

FIG. 7 schematically illustrates the optical system of the DIC inspection. In the DIC inspection, since the defect is inspected from the interference signal, the inspection with high accuracy cannot be performed when the interference signal is blurred or distorted due to the influence of aberration or the like. Thus, the dichroic mirror that couples and separates the optical system of the scattered light inspection and the optical path is configured to reduce the influence of the aberration caused by inserting the dichroic mirror into the optical path. Specifically, the influence of the aberration is reduced by arranging a dichroic mirror between the objective lens 200 and the relay lens 180. When the dichroic mirror is disposed between the wafer 10 and the objective lens 200, between the relay lens 180 and the lens 170, or the like, since the light on the wafer is concentrated at these positions for higher sensitivity, an optical path through which the concentrated light and the divergent light pass is formed. When a parallel plate such as a dichroic mirror is inserted into the concentrated light and the divergent light, aberration occurs, the interference signal is blurred or distorted, and inspection accuracy deteriorates. On the other hand, the influence of the aberration on the inspection accuracy is reduced by arranging a dichroic mirror in an optical path of substantially parallel light between the objective lens 200 and the relay lens 180.

Figure 8:
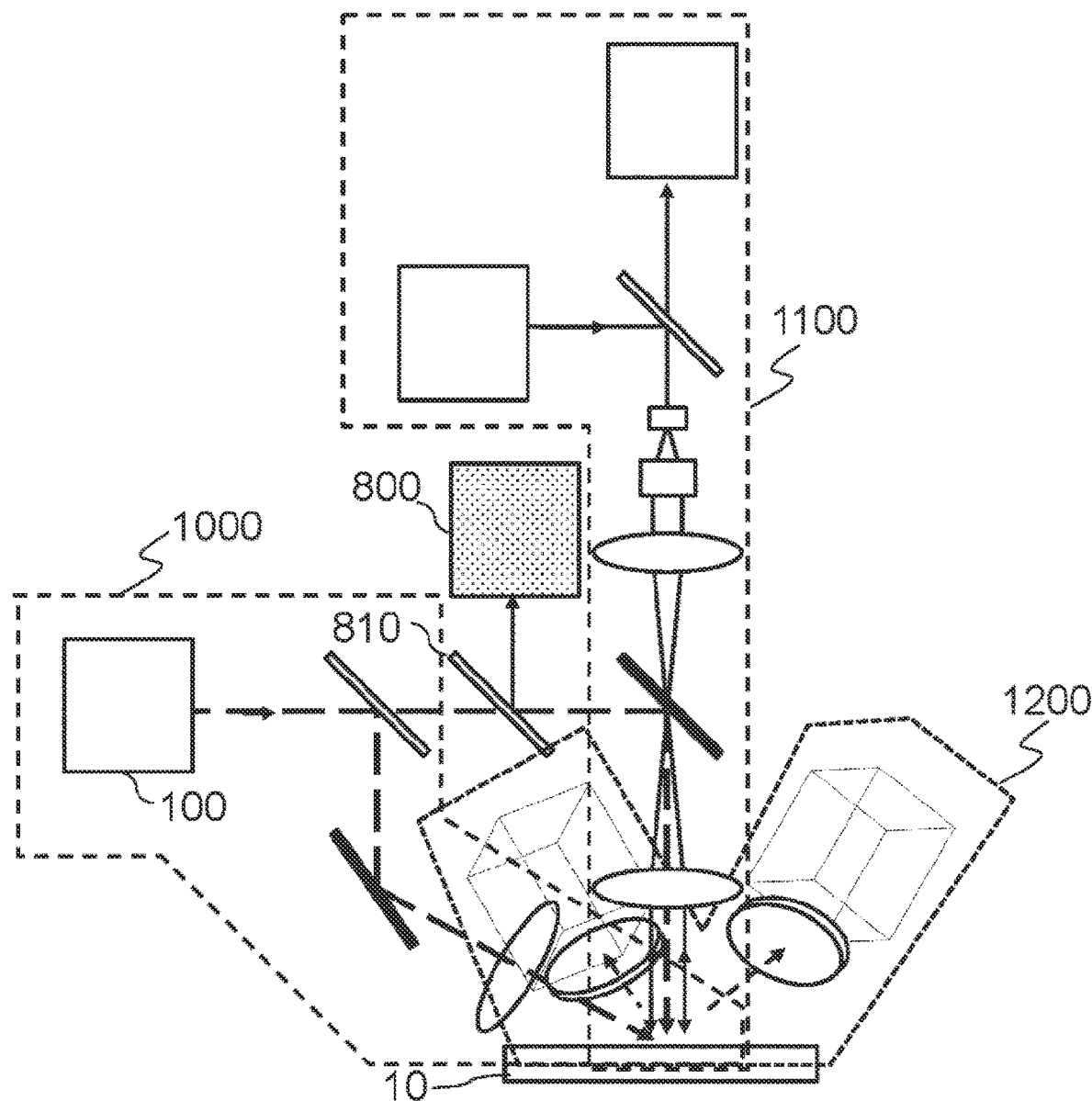
FIG. 8 is a modification example of the optical system of the defect inspection apparatus.

FIG. 8 illustrates a modification example of the optical system of the defect inspection apparatus. Although a basic configuration is similar to the configuration of the optical system illustrated in FIG. 2, an upward detection optical system 800 that detects reflected light or scattered light propagating upward is added. The UV light or the DUV light emitted from the pulsed light source 100 is incident on the wafer 10 by the epi-illumination or the oblique illumination. The reflected light or the scattered light of the light propagating upward from the wafer 10 is transmitted through the objective lens 200, is reflected by the dichroic mirror 190, and is guided to the upward detection optical system 800 by a beam splitter 810. Here, the beam splitter 810 may be a beam splitter or a polarization beam splitter that reflects and transmits a part of light. The upward detection optical system 800 can detect a bright-field image or a dark-field image of light by the epi-illumination. Alternatively, a dark-field image by the oblique illumination can be detected. The upward detection optical system 800 performs the detection, and thus, it is possible to perform various kinds of defect inspection with high sensitivity.

Figure 9:
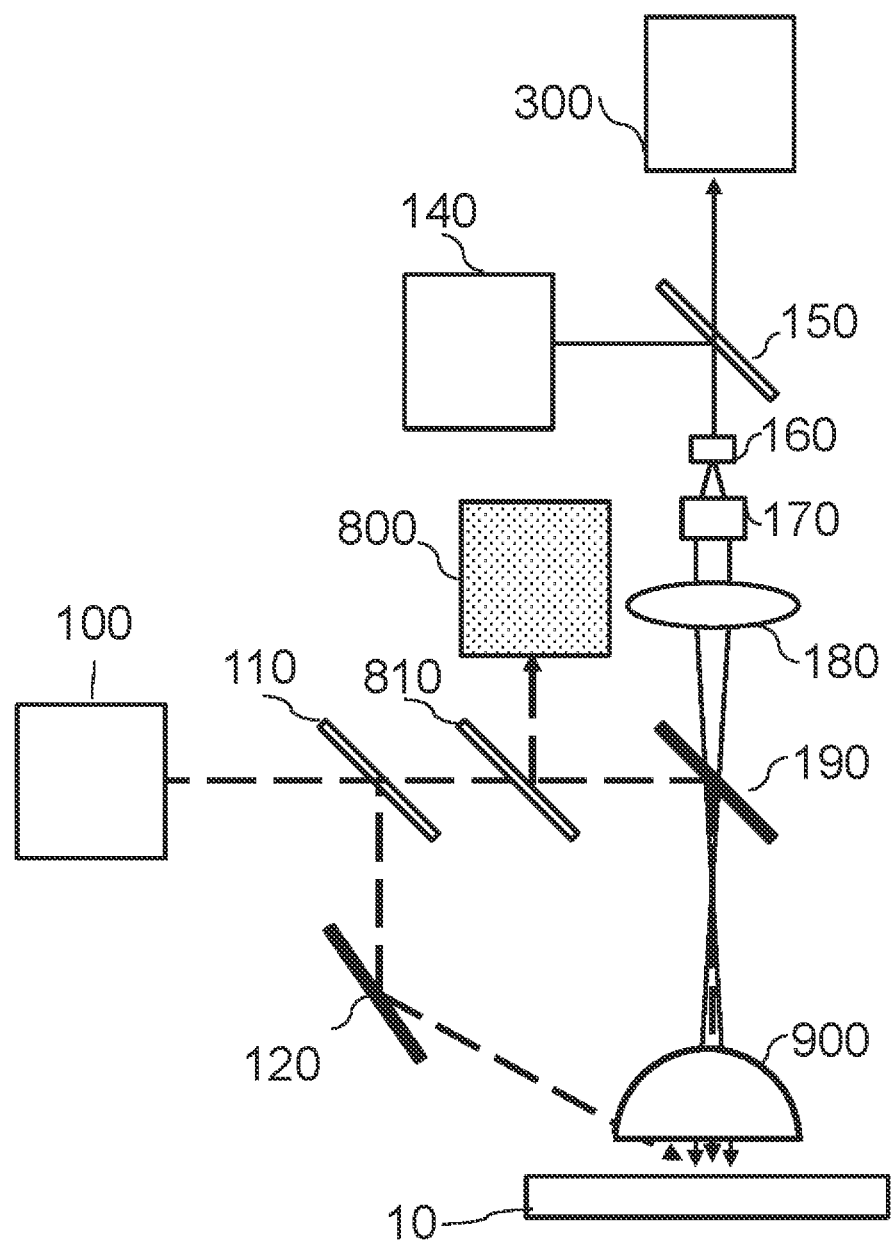
FIG. 9 is a modification example of the optical system of the defect inspection apparatus.

FIG. 9 illustrates another modification example of the optical system of the defect inspection apparatus. This optical system has a configuration including an objective lens 900 having a high NA and the upward detection optical system 800 instead of using the oblique detection optical system 1200. The scattered light is concentrated by the objective lens 900 having a high NA, and the concentrated scattered light is detected by the upward detection optical system 800. In this configuration, the scattered light inspection with high sensitivity can be performed without using the oblique detection optical system. In this configuration, since the focal depth is shortened by using a lens having a high NA for the objective lens 900, correction means such as autofocus may be used together in order to correct the influence of vibration and fluctuation of the wafer.

Figure 10:
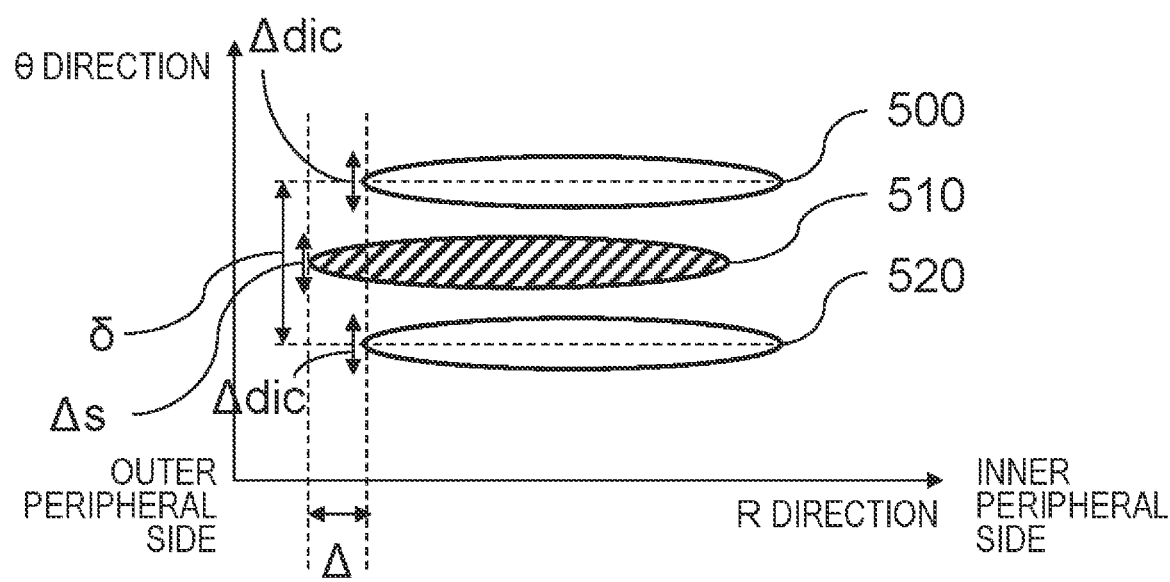
FIG. 10 is a modification example of spatial filtering.

A modification example of the spatial filtering will be described with reference to FIG. 10. The positional relationship between the light spots on the wafer is different from the positional relationship in FIG. 5A. FIG. 10 illustrates the positional relationship between the light spots according to the modification example. Similarly to FIG. 5A, the scattered light inspection light spot 510 is positioned between the DIC inspection light spots 500 and 520. The difference from FIG. 5A is that the scattered light inspection light spot 510 is positioned at a position shifted by Δ (>0) to an outer peripheral side of the wafer in the R direction from the DIC inspection light spots 500 and 520. When the wafer is scanned, scattered light due to a wafer edge, a wafer holding mechanism of the edge, or the like may increase at the time of inspecting an outermost periphery. Thus, the DIC inspection light spots 500 and 520 are incident on a wafer inner peripheral side and the scattered light inspection light spot 510 is incident on a wafer outer peripheral side, and thus, it is possible to prevent the scattered light of the visible light of the DIC inspection strongly scattered in a wafer outermost peripheral region from entering, as the stray light, the optical system of the scattered light inspection. As a result, it is possible to prevent a risk that the stray light of the strong DIC inspection enters the photon detector such as a PMT or an APD of the scattered light inspection and a failure of an element occurs or a failure in normal inspection due to large noise light. A magnitude of A may be variable depending on the position of the wafer in the R direction. The magnitude of A can be controlled by including an optical path control unit that controls the oblique illumination optical path 112 illustrated in FIG. 12 to be described later.

Figure 11A:
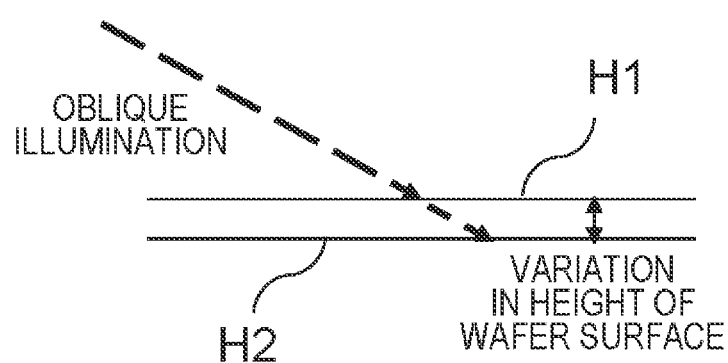
FIG. 11A is a diagram illustrating a reason why the light spot position changes by oblique illumination depending on a height of a wafer surface.

When a degree of flatness of the wafer as the inspection target is high, an effect of separating the light spots having different wavelengths can be obtained by arranging the light spots as illustrated in FIGS. 5A and 10. However, the degree of flatness of the wafer may not be maintained due to the influence of a chucking structure or the like of the wafer on the stage. When a height of the wafer is not constant as described above, the height of the wafer with respect to the optical system varies due to rotational movement of the wafer at the time of inspection, and thus, a light irradiation position by the oblique illumination changes as illustrated in FIG. 11A. FIG. 11A illustrates the irradiation position of the oblique illumination on the wafer when a wafer surface position (height) is H1 and when the wafer surface position (height) is H2 (H2<H1).

FIG. 11B illustrates a positional relationship between the light spots on the wafer when the wafer surface height varies. Incident condition 1 is a case where the oblique illumination is incident to be perpendicular to the sear direction, and incident condition 2 is a case where the oblique illumination is incident in parallel with the sear direction. An upper part illustrates a case where the wafer surface height is "H1" illustrated in FIG. 11A, and a lower part illustrates a case where the wafer surface height is H2 illustrated in FIG. 11A. The spot position of the scattered light inspection light spot 510 formed by the oblique illumination varies depending on the wafer surface height, whereas the spot positions of the DIC inspection light spots 500 and 520 do not vary due to the change in the wafer surface height since the spot position is formed by the light applied from a direction perpendicular to the wafer surface. Thus, a relative position between the scattered light inspection light spot 510 and the DIC inspection light spots 500 and 520 varies depending on the wafer surface height. For example, in the case of incident condition 1, the magnitude of A varies depending on the wafer surface height. In the case of incident condition 2, a distance between the light spots in the shear direction varies depending on the wafer surface height. As a result, an effect of preventing the light of the DIC inspection from entering, as the stray light, the optical system of the scattered light inspection at a wafer outer periphery deteriorates.

Figure 12:
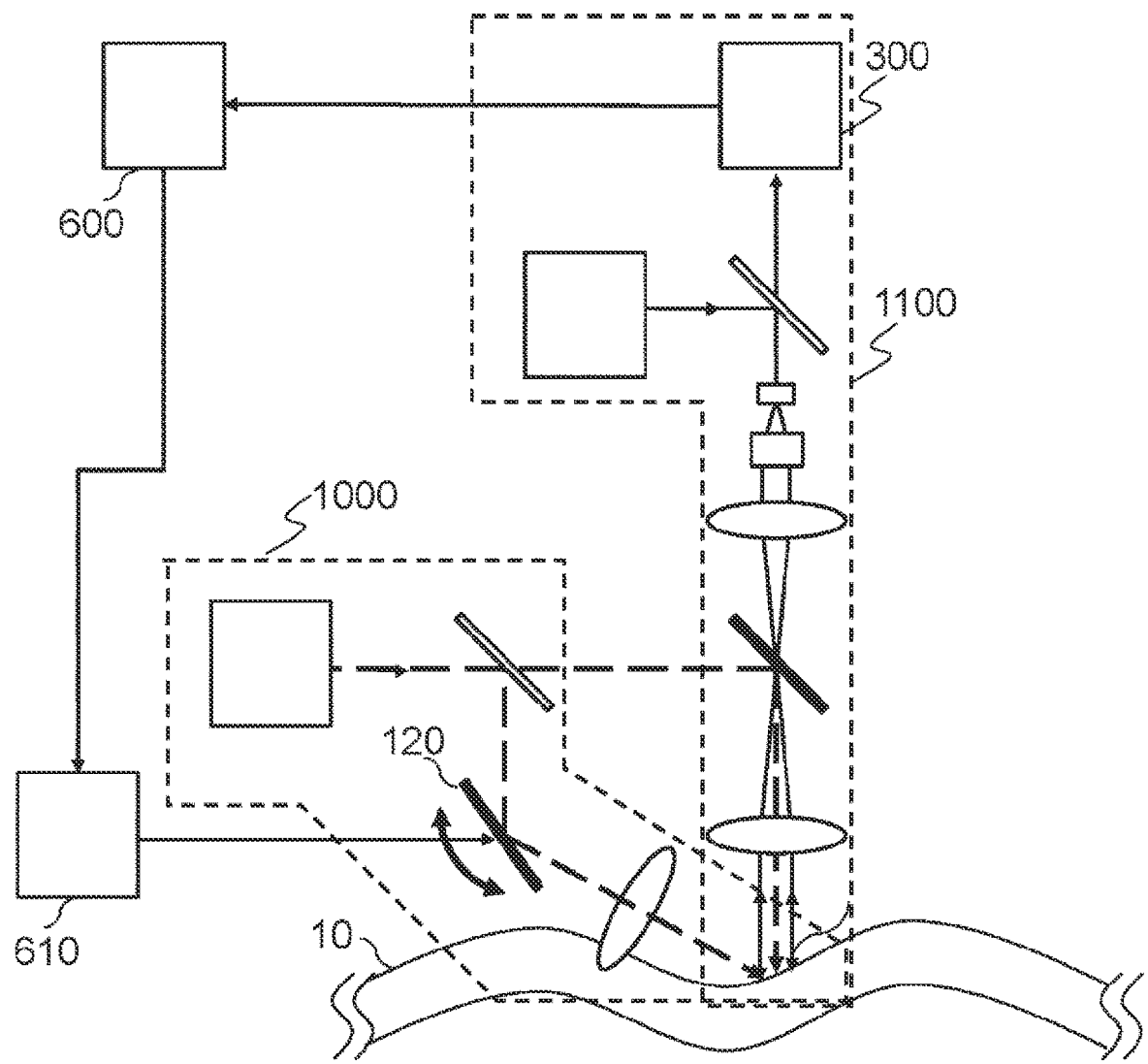
FIG. 12 is a modification example of the optical system of the defect inspection apparatus.

FIG. 12 illustrates a schematic configuration diagram for obtaining an effect of spatial filtering even when a degree of parallelism of the wafer 10 is low (for example, the surface height of the wafer 10 fluctuates about ±several tens μm). In the configuration of FIG. 12, even though the wafer surface height fluctuates, the arrangement of the light spot positions is constantly maintained in a desired relationship as illustrated in FIGS. 5A and 10 by monitoring the height of the wafer and finely adjusting the angle of the oblique illumination. The DIC optical system can obtain inclination information of the wafer surface from a principle. Thus, the inclination information of the wafer obtained by the DIC detection unit 300 is input to a wafer height estimation unit 600, and height information of the wafer is estimated from time-series pieces of inclination information of the wafer. This estimation result is input to an optical path control unit 610 to control an inclination of the mirror 120. As a result, the light spot position of the oblique illumination can be controlled, and even though the wafer surface height varies, the relationship between the spot positions can be constantly as illustrated in FIGS. 5A and 10. Here, although the example in which the optical path control unit 610 controls the inclination of the mirror 120 has been described, the method for controlling the oblique illumination optical path 112 is not limited to the above example.

Although the example in which the wafer surface height is detected by using the DIC optical system has been described, for example, the height of the wafer surface may be estimated by an autofocus mechanism or oblique illumination used in an optical disk or this principle that reflected light (specular reflected light) is directly detected and light is emitted from a reflection position. The irradiation position of the scattered light inspection light spot is controlled by such a real-time adjustment mechanism (or servo mechanism), and thus, the effect of spatial filtering can be reliably obtained even when the degree of flatness of the wafer is not maintained.

FIG. 13 illustrates still another modification example of the optical system of the defect inspection apparatus. According to the configuration of FIG. 13, the scattered light inspection can be performed by using the CW light (visible light) used in the DIC inspection and the oblique detection system. Although two DIC inspection light spots are formed on the wafer by the DIC optical system, when there is the defect or the like in the wafer, the scattered light due to this defect is generated. This scattered light is acquired by the oblique optical system. Specifically, a dichroic mirror 340 is disposed between the detector 310 for the scattered light inspection and the imaging optical system 320. The dichroic mirror 340 is designed to transmit UV light (or DUV light) and reflect visible light. The light reflected by the dichroic mirror 340 is incident on a detection optical system 330. The scattered light of the visible light for the DIC inspection is incident on the detection optical system 330, and thus, the scattered light inspection using CW light and the oblique detection system used in DIC inspection can be performed. Since the CW light for the DIC inspection has two light spots on the wafer, two signals are obtained for the same defect. Thus, for example, the scattered light inspection can be performed by performing signal processing such as deconvolution on time-series signals. Alternatively, the scattered light inspection can be performed by analyzing the signal by using the fact that the polarization directions of the two light spots are orthogonal to each other.

There are various kinds of defects, and classification of defects and high-sensitivity detection of a certain kind of defect can be performed by using information on oblique scattered light inspection performed with DIC illumination light (in addition, polarization information of the illumination). Since this inspection can be performed simultaneously with the DIC inspection and the scattered light inspection by the pulsed light source, there is also an effect that the inspection can be performed without increasing an inspection time (with no in a throughput).

FIG. 14 illustrates a table in which an illumination method and a detection method described above as the embodiment and the modification example are organized. The illumination system includes "DIC and epi-illumination" and "oblique illumination". On the other hand, the detection system includes "upward detection" and "oblique detection", and the detector corresponding to each light source is used. When a combination of 2×2 of these illumination and detection systems is considered, the illumination and detection systems can be classified and collected as illustrated in FIG. 14 in the embodiment so far. Here, "DIC scattering" means that the oblique detection is performed by using the DIC illumination light (long-wavelength CW light).

The present invention has been described above in conjunction with the embodiment and the modification examples. The present invention is not limited to aspects of the aforementioned embodiment and modification examples. For example, in order to detect the low step defect, other interference measurement methods, for example, a phase contrast microscope, digital holography, or the like, in which a long-wavelength light is applied from above to detect the low step defect may be used instead of the DIC detection optical system. In the phase contrast microscope, the defect can be detected by converting a phase difference of a target into a contrast of an image by interfering components having different spatial frequencies of the image in reflected light from the inspection target. Digital holography in which an image of an interference fringe in which light of a bright-field image of a target and reference light interfere with each other is analyzed, and thus, it is possible to detect the defect by acquiring a three-dimensional image of the inspection target.

The number of oblique detection optical systems is not limited to two, and two or more oblique detection optical systems may be provided in order to further increase the sensitivity and detect various kinds of defects. As a result, the scattered light from the inspection target can be detected in a wider range. In the above example, although a transmitted optical path of the dichroic mirror is the DIC optical system and a reflected optical path is the scattered light illumination system, the relationship between transmission and reflection may be reversed.

REFERENCE SIGNS LIST 10 wafer
100 pulsed light source
110 beam branching unit
111 epi-illumination optical path
112 oblique illumination optical path
120 mirror
130, 200, 900 objective lens
140 CW light source
150, 810 beam splitter
160 Nomarski prism
170 lens
180 relay lens
190, 340 dichroic mirror
300 DIC detection unit
310, 400 detector
320 imaging optical system
330 detection optical system
410 light distribution monitor
420 switching mirror
430 imaging lens
500, 520 DIC inspection light spot
510 scattered light inspection light spot 600 wafer height estimation unit
610 optical path control unit
800 upward detection optical system
1000 oblique illumination optical system
1100 DIC and epi-illumination optical system
1200 oblique detection optical system
1300 signal processing unit
1400 stage unit
1500 control unit

The invention claimed is:

1. A defect inspection apparatus that inspects a defect of a wafer, the apparatus comprising:
   a first light source which emits light having a first wavelength;
   a beam branching unit which branches the emitted light from the first light source into a first optical path and a second optical path;
   a second light source which emits light having a second wavelength longer than the first wavelength;
   a polarization separation type prism which separates the emitted light from the second light source into first emitted light having a first polarization direction and second emitted light having a second polarization direction orthogonal to the first polarization direction;
   a stage on which the wafer is mounted;
   a first objective lens which is disposed such that an optical axis is perpendicular to a wafer mounting surface of the stage;
   an oblique illumination system which has an optical axis forming a predetermined acute angle with respect to the wafer mounting surface of the stage;
   a first dichroic mirror which reflects the light having the first wavelength and transmits the light having the second wavelength or transmits the light having the first wavelength and reflects the light having the second wavelength; and
   a plurality of oblique detection optical systems which detects scattered light of the light having the first wavelength from the wafer,
   wherein
   the emitted light of the first optical path from the first light source which is reflected from or transmitted through the first dichroic mirror and the first emitted light and the second emitted light from the second light source which are transmitted through or reflected from the first dichroic mirror are incident on the first objective lens,
   the emitted light of the second optical path from the first light source is incident on the oblique illumination system,
   the oblique detection optical system is disposed such that an optical axis of an imaging optical system of the oblique detection optical system forms a predetermined acute angle with respect to the wafer mounting surface of the stage, and
   an optical system including the second light source, the polarization separation type prism, and the first objective lens includes a detection unit which detects reflected light of the first emitted light and reflected light of the second emitted light from the wafer which pass through the optical system in an orientation opposite to the first emitted light and the second emitted light.

2. The defect inspection apparatus according to claim 1, wherein
   the light having the first wavelength is a pulsed light source in a wavelength range of UV light or DUV light, and
   the light having the second wavelength is a continuous light source in a wavelength range of visible light.

3. The defect inspection apparatus according to claim 2, further comprising an upward detection optical system which detects scattered light of the light having the first wavelength from the wafer,
   wherein the upward detection optical system detects the scattered light of the light having the first wavelength from the wafer which is reflected from or transmitted through the first dichroic mirror.

4. The defect inspection apparatus according to claim 2, wherein
   the oblique detection optical system includes a photon detector which detects the light having the first wavelength, and
   in the photon detector, a time window for detection is set in synchronization with a pulsed light emission timing of the first light source.

5. The defect inspection apparatus according to claim 1, wherein
   the oblique detection optical system includes a first detector which is disposed on the optical axis of the imaging optical system to detect the light having the first wavelength, a second dichroic mirror which transmits the light having the first wavelength and reflects the light having the second wavelength, and a second detector which detects the light having the second wavelength reflected by the second dichroic mirror.

6. The defect inspection apparatus according to claim 2, wherein
   the detection unit includes a light intensity detector which detects the light having the second wavelength, and
   in the light intensity detector, a time window for detection is set in reverse synchronization with a pulsed light emission timing of the first light source.

7. The defect inspection apparatus according to claim 1, wherein
   the detection unit includes a detector which detects the light having the second wavelength and a light distribution monitor which monitors a distribution of the light having the first wavelength and a distribution of the light having the second wavelength in the wafer.

8. The defect inspection apparatus according to claim 1, wherein
   the emitted light of the second optical path from the first light source and the first emitted light and the second emitted light from the second light source form a first light spot, a second light spot, and a third light spot separated from one another on the wafer,
   each of the first to third light spots has a linearly extending shape, and
   the first to third light spots are arrayed in a direction perpendicular to longitudinal directions thereof, and the first light spot is positioned between the second light spot and the third light spot.

9. The defect inspection apparatus according to claim 8, wherein
   the longitudinal directions of the first to third light spots match a radial direction of the wafer, and
   the first light spot is positioned on an outer peripheral side of the wafer with respect to the second light spot and the third light spot.

10. The defect inspection apparatus according to claim 8, further comprising:
    a wafer height estimation unit which estimates a surface height of the wafer; and an optical path control unit which controls the second
optical path from the first light source, based on height
information of the wafer estimated by the wafer height
estimation unit.

* * * * *